United States Patent [19]
Bouwhuis

[11] 3,911,209
[45] Oct. 7, 1975

[54] OPTICAL SYSTEM FOR IMAGING AN OBJECT, THE FOCUSSING BEING MAINTAINED INDEPENDENT OF A VARIATION IN THE DISTANCE BETWEEN THE OBJECT PLANE AND THE IMAGE PLANE

[75] Inventor: Gijsbertus Bouwhuis, Eindhoven, Netherlands

[73] Assignee: U.S. Philips Corporation, New York, N.Y.

[22] Filed: Nov. 21, 1973

[21] Appl. No.: 418,061

[30] Foreign Application Priority Data
Dec. 1, 1972 Netherlands ....................... 7216306

[52] U.S. Cl.. 178/6.6 R; 178/6.7 AX; 179/100.3 V; 350/46; 350/255
[51] Int. Cl.$^{2}$........................ G02B 7/02; G11B 7/12
[58] Field of Search ........... 350/46, 47, 255, 54, 87; 178/6.6 R, 6.7 AX; 179/100.3 V

[56] References Cited
UNITED STATES PATENTS

| | | | |
|---|---|---|---|
| 2,171,360 | 8/1939 | Strang | 350/54 |
| 2,391,430 | 12/1945 | Macek | 350/47 |
| 2,398,276 | 4/1946 | Altman | 350/54 |
| 2,552,238 | 5/1951 | Turner et al. | 350/175 TS |
| 3,419,321 | 12/1968 | Barber et al. | 350/46 |
| 3,506,329 | 4/1970 | Weaver | 350/54 |
| 3,511,149 | 5/1970 | Blattner et al. | 350/255 |
| 3,623,790 | 11/1971 | Buckstad | 350/46 |

*Primary Examiner*—Eli Lieberman
*Attorney, Agent, or Firm*—Frank R. Trifari; Simon L. Cohen

[57] ABSTRACT

An optical system is described for imaging an object in a plane, the focussing being maintained independent of a variation in the length of the optical path between the object plane and the image plane. By using a first, stationary lens system which forms a reduced image and a second, movable lens system which forms an enlarged image, the system can be readjusted using relatively low power.

2 Claims, 5 Drawing Figures

Figure 1:
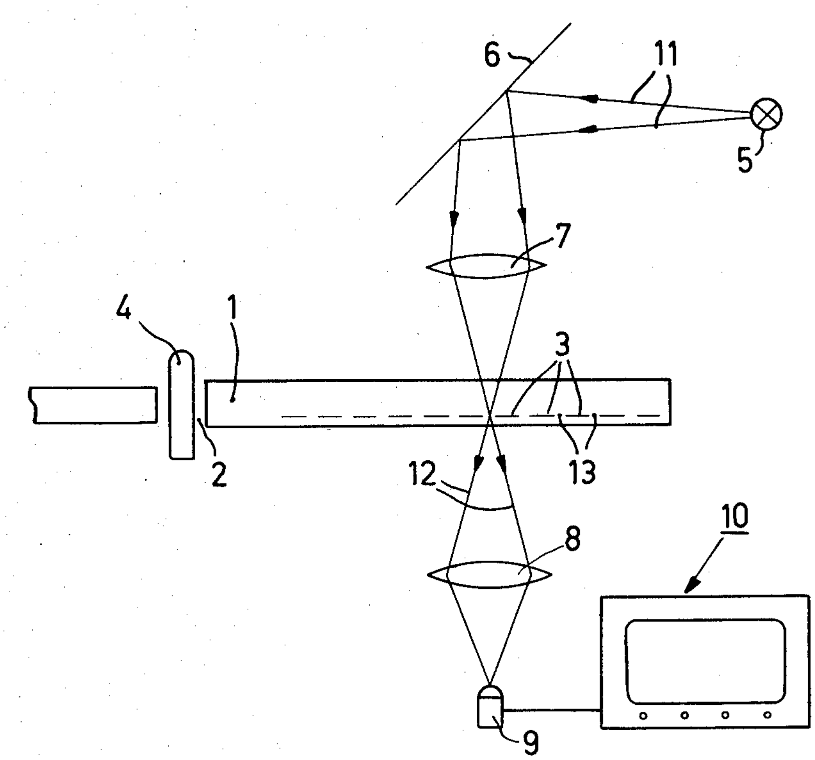

OPTICAL SYSTEM FOR IMAGING AN OBJECT, THE FOCUSSING BEING MAINTAINED INDEPENDENT OF A VARIATION IN THE DISTANCE BETWEEN THE OBJECT PLANE AND THE IMAGE PLANE

The invention relates to an optical system for imaging an object in a plane, the focussing being maintained independent of a change in the length of the optical path between the object plane and the image plane.

Such a system can, inter alia, be employed in a device for reading a flat record carrier, on which video and/or audio information is stored in, for example, a spiral track which comprises an optical structure. When reading such a record carrier always a small portion of the optical structure of the record carrier should be imaged onto a radiation-sensitive signal detection system. Care should then be taken that the size of this portion corresponds to the smallest detail of the optical structure.

The radiation paths between the radiation source which supplies a read beam and the plane of the track to be read and between said plane and the signal detection system may be subject to small variations. These variations may be caused by out-of-flatness of the record carrier or undulations occurring when a foil-like record carrier is rotated or by vibrations of elements in the read device. Such variations may result in the modulation depth of the read beam which is modulated by the optical structure being reduced, while moreover cross-talk may occur.

For accurately reading the record carrier the optical system is to be adapted to the said variations in the radiation paths. It is known, for example from U.S. Pat. No. 2,504,384, that in an imaging system the focal distance can be adjusted by moving an objective. An automatic focussing is known from U.S. Pat. No. 3,198,880. When employing the known principle in a read device for a record carrier a single objective would have to be moved over a relative large distance. For moving the objective a power is required which is proportional to the square of the distance to be covered. When reading a record carrier the plane of the track to be read may exhibit high-frequency vibrations relative to the elements of the read device. The location of the plane in which the objective produces an image must therefore be capable of being moved very rapidly. However, as a result of this, an upper limit is reached of the power used for correction, and thus of the distance over which correction is possible.

The object of the invention is to provide an optical system of the type mentioned in the preamble whose imaging plane can be adjusted without high power being required for this. The system according to the invention is characterized by a first, stationary lens system which produces a reduced image and a second, movable lens system which produces an enlarged image. As the movable lens system produces an enlarged image, a variation in the length of the optical path between the exit pupil of the optical system and the plane in which an image is to be formed, may be corrected by moving said lens system over a distance which is considerably smaller than the said variation in optical path length.

Figures 2A, 2B:
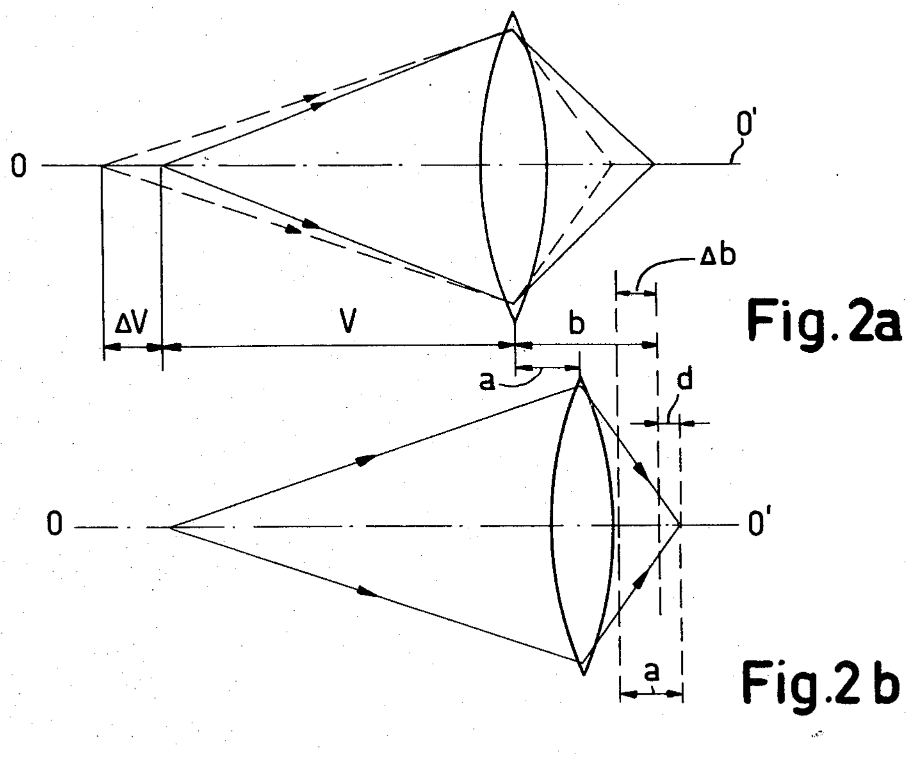
Figure 3:
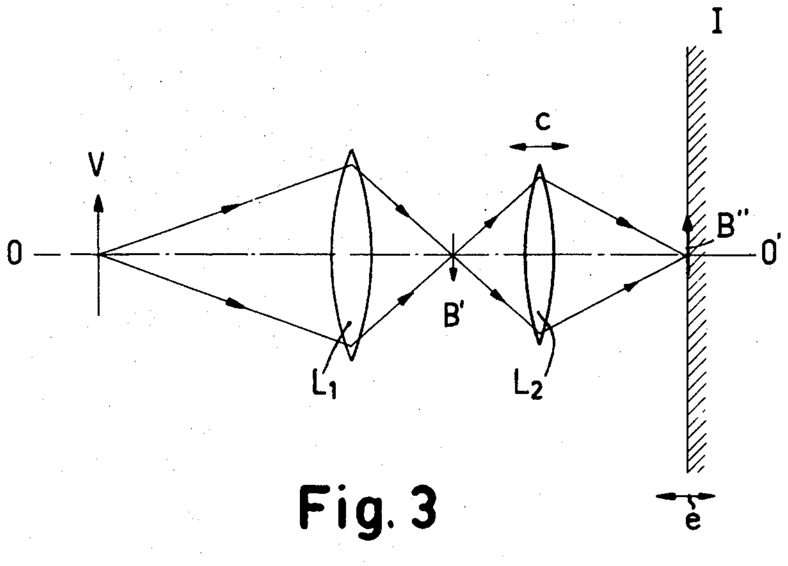
Figure 4:
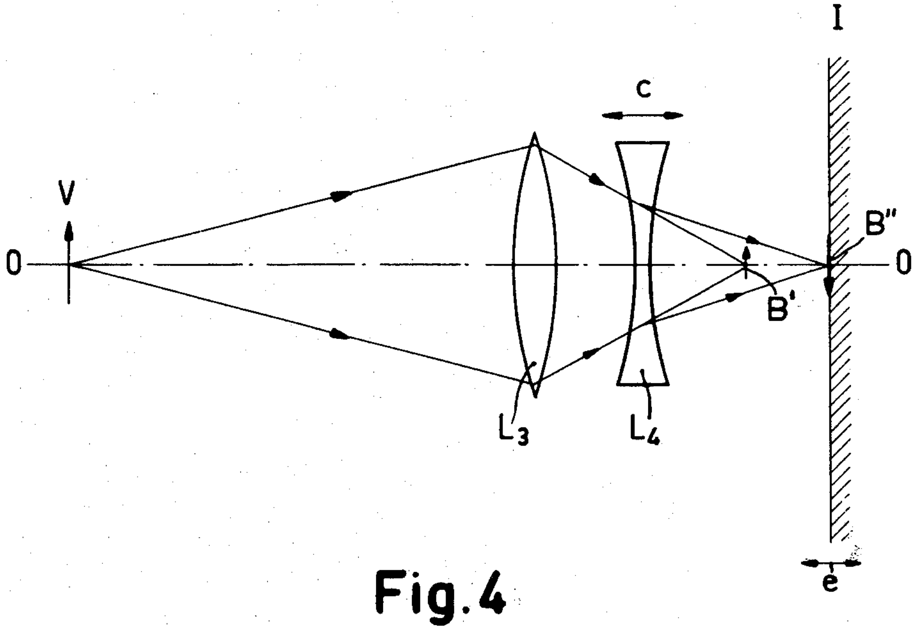

The invention will be described, by way of example, by discussing its application in a device for reading a flat record carrier, referring to the drawing, in which:

FIG. 1 schematically shows such a previously proposed read device,

FIGS. 2*a* and 2*b* illustrates the relationship between the various displacements, and FIGS. 3 and 4 show two embodiments of an optical system according to the invention.

In the read device according to FIG. 1 the round record carrier 1, which is shown in radial cross-section, is rotated by a shaft 4, which is driven by a motor, not shown, said shaft protruding through a central opening 2 in the record carrier. The beam 11 from the radiation source 5 is reflected to the record carrier by the plane mirror 6. The lens 7 forms an image of the source 5 in the plane of the optical structure of the record carrier, the order of magnitude of said image corresponding to that of the smallest detail in the optical structure.

The record carrier comprises a number of concentric tracks 3, or one continuous spiral-shaped track, which tracks or track in this case are located at the underside of the information carrier. Each track consists of a number of alternately arranged blocks and areas. The tracks are separated by intermediate, information-free strips 13. The blocks in a track may, for example, be radiation-absorbing and the areas are then radiation-transmitting. The amplitude of a beam which traverses the record carrier is then influenced. It is also possible to give the optical structure the form of a phase structure, for example, by arranging the blocks and areas, with equal transmission coefficients, at different levels in the record carrier. Instead of a radiation-transmitting record carrier it is also possible to opt for a radiation-reflecting record carrier, the elements 8 and 9 then being arranged in the path of the radiation which is reflected by the record carrier. The lengths of the blocks and areas represent the stored information. A beam which is modulated by the optical structure of the record carrier exhibits pulse-shaped variations in time, in accordance with the sequence of blocks and areas in a track.

The read beam 12 which is modulated by a track of the record carrier is concentrated onto a radiation-sensitive detector 9 by the lens 8. The output of this detector may be connected to a device 10, which is provided with known electronic means for converting the output signal supplied by the detector into image and sound.

When reading the record carrier only a small portion, of the optical structure of the order of magnitude of the smallest detail in the optical structure of the record carrier, may be imaged on the detector 9. This can only be the case if the plane of the track portion to be read occupies a fixed position in the read device. As already stated in the introduction, this need not always be the case, to that the position of the lens will have to be shifted.

The distance over which a lens will have to be moved to maintain a sharp image in the imaging plane if this plane is displaced over a certain distance, can be derived as follows with the aid of FIGS. 2*a* and 2*b*.

From the known lens formula for a lens:

$$\frac{1}{v} + \frac{1}{b} = \frac{1}{f}$$

it follows that at constant focal distance $f$, the relation between a change ($\Delta$ V) in the object distance ($v$) and the resulting change ($\Delta b$) in image distance ($b$) (see FIG. 2a) is given by:

$$\frac{\Delta v}{v^2} = - \frac{\Delta b}{b^2}$$

The magnification (N) of a lens is given by:

$$N = \frac{b}{v}$$

so that $$\Delta v = - \frac{\Delta b}{N^2} \qquad (1)$$

A displacement of the object over a distance $\Delta v$ results in a displacement of the image over a distance — $\Delta b$. If the image is to be moved over a distance $d$ (see FIG. 2b) then, if the location of the object does not change; the lens will have to be moved over a distance $a$, $a$ being given by $$a = d + \Delta b.$$

As the location of the object does not change, $$a = \Delta v = d + \Delta b \qquad (2)$$

By inserting the value $b$ of formula (2) in formula (1), it appears that:

$$a = - \frac{d}{N^2-1} \qquad (3)$$

For the read device according to FIG. 1 this means that if the plane of the track portion to be read is displaced over a distance $d$. the lens 7 will have to be displaced over a distance $$\frac{1}{N^2-1} \times d.$$

If the lens 7 has a magnification of $$N = \frac{1}{20},$$

then in order to achieve the desired sharp image of the source 5 in the plane of the track portion to be read-out, the lens will have to be moved over a distance of approximately $d$. The power required for this is proportional to $d^2$. By using an optical system according to the invention instead of the lens 7, the power required for correction can be considerably reduced, so that rapid variations occurring in the read device can also be followed.

As is shown in FIG. 3 the optical imaging system according to the invention consists of a first lens $L_1$ which has a fixed location and a second lens $L_2$ which can be moved along the optical axis of 00′ as indicated by the double arrow C. The lens $L_1$ produces a reduced intermediate image B′ of an object V, for example, the radiation source 5 of the device according to FIG. 1. The lens $L_2$ produces an enlarged final image B″ of the image B′ in the plane I, for example the plane of the track portion to be read which plane is susceptible of a displacement as indicated by the double arrow $e$.

For example, when the size of the final image B″ should be 1/20 of that of the object V, a magnification $$N_1 = \frac{1}{40}x$$

may be chosen for $L_1$ and a lens having a magnification of $N_2 = 2x$ may be chosen for $L_2$. When inserting the value $N_2$ for the movable lens $L_2$ in equation (3) it appears that for this lens $a = -\bar{}d$. This means that when the plane I is moved over a certain distance, the lens $L_2$ need only be moved over one third of that distance to maintain a sharp image on the plane I.

The power required to move the lens is proportional to the square of the travelling distance. Therefore, in the above example, a power will be required which is equal to the ninth part of the power that would be required to follow the displacement of the imaging plane with a single lens having a magnification of $N = 1/20$.

When using an imaging system according to FIG. 3 in the read device according to FIG. 1, the movement of the lens $L_2$ is controlled with the aid of a signal derived from an image detection system. An image detection system is to be understood to means an optoelectronic system which supplies a signal, which is proportional to the deviation between the actual plane of imaging of an object and the desired image plane. Several image detection systems have been proposed. Generally they use two or more radiation-sensitive detectors, a difference in the output signals of said detectors providing an indication about the relative position of the plane of the track portion to be read. Different image-detection systems are described in the Applicant's co-pending U.S. patent application Ser. No. 229,291, filed Feb. 25, 1972 and now U.S. Pat. No. 3,833,769; U.S. Ser. No. 340,997, filed Mar. 14, 1974; U.S. Ser. No. 358,994, filed May 10, 1973; and U.S. Ser. No. 345,644 filed Mar. 28, 1973.

It is evident that in the device according to FIG. 3 the sequence of the lenses $L_1$ and $L_2$ may be reversed.

Instead of consisting of two positive lenses, as is shown in FIG. 3, an imaging system according to the invention may also consist of a positive lens $L_3$ and a negative lens $L_4$, as is shown in FIG. 4. The diverging lens $L_4$ is interposed between the lens $L_3$ and the intermediate image B′ produced by the lens $L_3$.

As stated hereinbefore, the imaging system according to the invention may be employed in the read device according to FIG. 1 to image the radiation source onto the track portion to be read. However, it is also possible to illuminate a relative large area of the record carrier in the read device and image only a part of the illuminated track portion of the size of the smallest detail in the optical structure onto the radiation-sensitive detector. This situation may also be viewed in such a way that the detector is to be imaged onto the plane of the track portion to be read, so that it will be evident at once that also in this case an imaging system according to the invention can be applied.

The fact that the optical system according to the invention is described with reference to a device for reading a flat record carrier by no means implies that the scope of the invention is limited to said device.

On the contrary, the optical system according to the invention can be employed in all devices in which an object is to be imaged, while maintaining its sharpness, in a plane which may be subject to high-frequency vibrations and in which an image-detection system is provided.

What is claimed is:

1. Objective system for imaging an object in a moving plane, for use in a system wherein the focussing is maintained independent of a variation in the length of the optical path between the object plane and the moving image plane, said system having an optical axis moveable transversely with respect to the moving plane said system comprising a first lens system means for forming a reduced primary image of the object, said first lens system being fixed along said optical axis, and a second lens system means adjacent said first lens system means for forming an enlarged secondary image of said primary image, said second lens system being movable along the optical axis of said optical system, whereby the ratio of the axial image motion to the motion of the second lens system means is greater than one.

2. A device for reading a flat record carrier on which information, for example video and/or audio information, is stored in at least one track having an optical structure, said device comprising a radiation-sensitive signal detection system for converting the read beam, which is produced by the radiation source and modulated by the information, into electrical signals, the radiation path from the radiation source to the signal detection system including an optical system having an optical axis and comprising a first lens system means for forming a reduced primary image of the object, said first lens system means being stationary along said optical axis, and a second lens system means adjacent said first lens system means for forming an enlarged secondary image of the primary image, said second lens system means being movable along said optical axis, an image-detection system for determining the focus of said optical system, the movable lens system of said optical system being controlled by a control signal derived from said image-detection system.

* * * * *

UNITED STATES PATENT AND TRADEMARK OFFICE

CERTIFICATE OF CORRECTION

PATENT NO. : 3,911,209

DATED : October 7, 1975

INVENTOR(S) : GIJSBERTUS BOUWHUIS

It is certified that error appears in the above-identified patent and that said Letters Patent are hereby corrected as shown below:

IN THE SPECIFICATION

Col. 2, line 54, "to" first occurence should be --so--;

Col. 4, line 19, "a =——-d" should be --a = $-\frac{1}{3}$d--;

IN THE CLAIMS

Claim 1, line 6, after "plane" insert -- , --;

Signed and Sealed this

*third* Day of *February 1976*

[SEAL]

*Attest:*

RUTH C. MASON
*Attesting Officer*

C. MARSHALL DANN
*Commissioner of Patents and Trademarks*